A. WESTPHAL.
VEHICLE WHEEL.
APPLICATION FILED SEPT. 3, 1910.
978,249.
Patented Dec. 13, 1910.
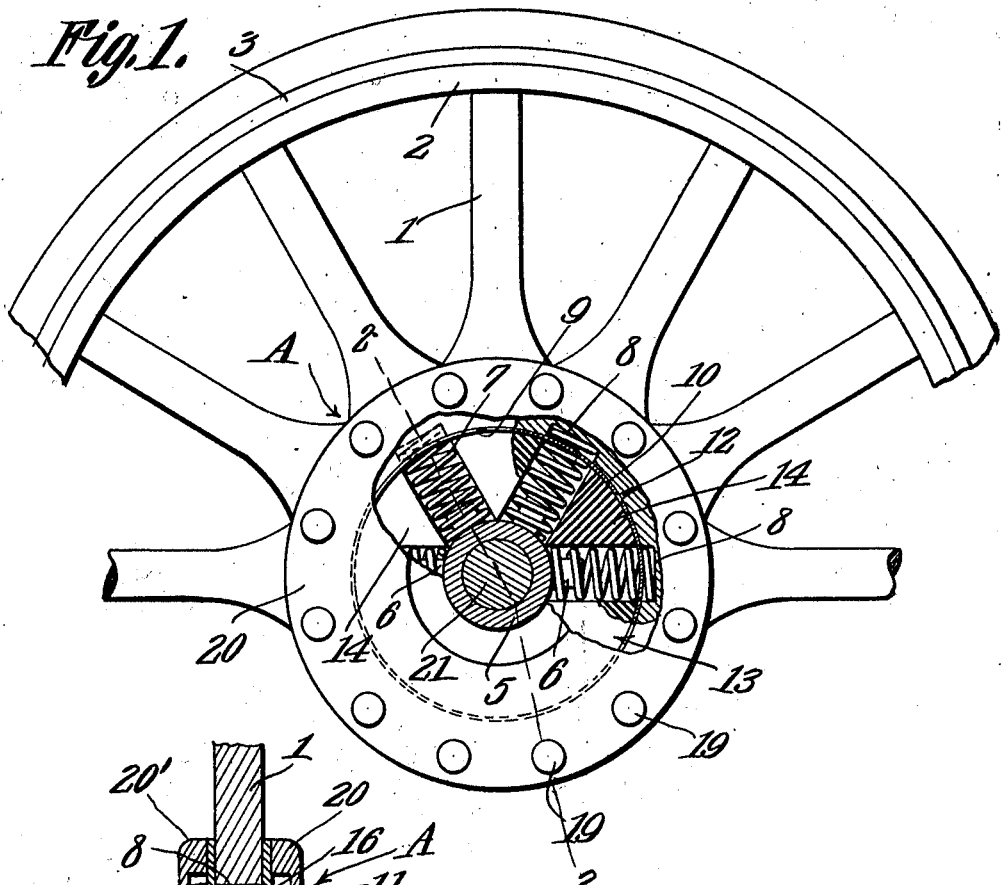
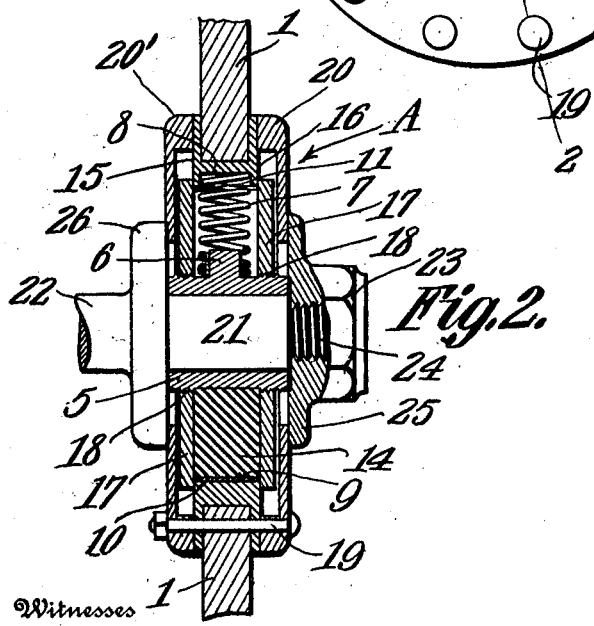
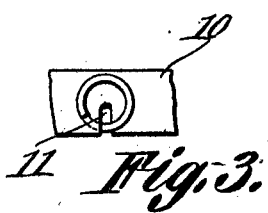
Witnesses
Frank B. Wooden.
Justus Riehl.
Inventor
Albert Westphal.
By Henry S. Brewington.
Attorney

UNITED STATES PATENT OFFICE.

ALBERT WESTPHAL, OF BALTIMORE, MARYLAND, ASSIGNOR OF ONE-HALF TO W. TRICKETT GILES, OF BALTIMORE, MARYLAND.

VEHICLE-WHEEL.

978,249.  Specification of Letters Patent.  Patented Dec. 13, 1910.

Application filed September 3, 1910. Serial No. 580,428.

*To all whom it may concern:*

Be it known that I, ALBERT WESTPHAL, a citizen of the United States, residing at Baltimore city, State of Maryland, have invented certain new and useful Improvements in Vehicle-Wheels, of which the following is a specification.

My invention relates to an improvement in vehicle wheels, and has for its object the construction of wheels for road vehicles in such a manner as to obtain a certain degree of resilience without the danger of punctures, such as happen to pneumatic tires and render them inefficient.

With the foregoing object in view, my invention consists in certain novel features of construction and combinations of parts which will be hereinafter described and pointed out in the claims, reference being had to the accompanying drawings, forming a part of this specification, in which similar letters of reference, are used to designate the same parts throughout the several views, in which—

Figure 1 is an elevation of a portion of a wheel constructed in accordance with my invention parts being broken away and parts in section; Fig. 2 is a sectional view on the line 2—2 of Fig. 1, and Fig. 3 is a top plan view of one of the springs and a portion of the retaining ring.

A, indicates the hub of the wheel, made from any suitable material, preferably metal, provided with spokes 1, felly 2, channel tire 3, and tire 4, the tire 4 being made from any suitable material, preferably rubber, or other resilient composition of which rubber forms a basis.

5 indicates a sleeve, provided with laterally extended arms 6; secured around the arms 6, are spiral springs 7, the free ends of the springs being secured in sockets 8 provided in the inner face 9 of the hub, and held in position by means of the metal band 10, provided with slots 11, the slots fitting around the springs 7 retaining the springs in the sockets, the band being secured on the inner face of the hub by any suitable means, such as screws 12 as shown.

Provided in the substantially triangular spaces 13, between the springs 7, and the band 10, are elastic cushioning springs 14, made from suitable resilient material, preferably rubber, adapted to be compressed, and to a degree limit the tension on the springs 7. Provided on each end of the sleeve 5, adjacent to the end faces 15 and 16 of the hub are threaded washers 17, the sleeve being threaded at 18—18 for the purpose of securing the washers thereon, the washers serving to retain the mechanism within the hub, and form a housing for the mechanism within the hub so as to render the hub practically dust proof.

Secured on the end faces 15 and 16 of the hub, by means of the bolts 19, and over the washers 17 are caps 20 and 20' respectively, the inner diameter of the caps being greater than that of the washers, so as to permit the play of the washers therein, occasioned by the compression tension on the springs due to pressure at the tread of the wheel which is transmitted and absorbed by the springs, the caps forming a housing for the washers.

21 indicates the spindle of an axle 22, on which the wheel is provided, the spindle being inserted through the sleeve 5, and secured thereon by means of the threaded cap nut 23, the spindle being threaded at 24 to receive the nut; the flange 25 of the nut fitting snugly against the cap 20, so as to render the cap practically dust proof, but at the same time loose enough to permit free movement between these parts. Provided on the axle 22, adjacent to the spindle 21, is a collar 26, which serves a purpose similar to that of the flanged nut on the opposite end relative to the cap 20'.

It will be observed that in a wheel constructed in accordance with my invention just described, I have provided a wheel of novel construction, in which the shock or jar received at the circumference of the wheel is transmitted to the hub, and absorbed by the mechanism contained therein, and while for purposes of illustration, I have shown a wheel constructed with a cushion tire, my invention is not limited to this form of tire, and is effective where other kinds of tires of less resilient character are used.

Slight changes and alterations might be resorted to in the form and arrangement of the several parts described, without departing from the spirit and scope of my invention, and hence I do not wish to limit myself to the exact construction as herein set forth; but, Having fully described my invention, what I claim as new and desire to secure by Letters Patent, is:

1. In a wheel of the character described, comprising a hub provided with sockets, a sleeve within the hub having radial arms, springs having one end held in position by said arms and their other ends resting in said sockets, and a metal band provided with openings through which one end of the springs pass to retain said ends in said sockets.

2. In a wheel of the character described, comprising a hub provided with sockets, a sleeve within the hub having radial arms, springs having one end held in position by said arms and their other ends resting in said sockets, a metal band provided with openings through which one end of the springs pass to retain said ends in said sockets, and triangular cushions between said springs.

In testimony whereof I affix my signature in presence of two witnesses.

ALBERT WESTPHAL.

Witnesses:
E. WALTON BREWINGTON,
HOWELL H. THOMAS.